US009606813B2

(12) United States Patent
Nanaumi

(10) Patent No.: US 9,606,813 B2
(45) Date of Patent: Mar. 28, 2017

(54) INFORMATION PROCESSING APPARATUS, APPLICATION ACTIVATION METHOD, AND PROGRAM

(71) Applicant: CANON KABUSHIKI KAISHA, Tokyo (JP)

(72) Inventor: Yoshihito Nanaumi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 941 days.

(21) Appl. No.: 13/850,706

(22) Filed: Mar. 26, 2013

(65) Prior Publication Data
US 2013/0263137 A1 Oct. 3, 2013

(30) Foreign Application Priority Data
Mar. 30, 2012 (JP) ................. 2012-082381

(51) Int. Cl.
G06F 9/44 (2006.01)
(52) U.S. Cl.
CPC .................. G06F 9/4443 (2013.01)
(58) Field of Classification Search
None
See application file for complete search history.

(56) References Cited

U.S. PATENT DOCUMENTS

| 6,173,445 B1* | 1/2001 | Robins | G06F 9/4443 717/173 |
| 2004/0030882 A1* | 2/2004 | Forman | G06F 9/445 713/100 |
| 2005/0071253 A1 | 3/2005 | Yang | |
| 2007/0005743 A1* | 1/2007 | Herzog | H04L 67/104 709/223 |
| 2008/0288763 A1* | 11/2008 | Reik | G06F 9/4401 713/2 |
| 2009/0319933 A1* | 12/2009 | Zaika | G06F 3/048 715/772 |
| 2011/0004749 A1* | 1/2011 | Bennetts | G06F 1/3203 713/100 |
| 2011/0167364 A1* | 7/2011 | Pentikainen | G06F 9/4443 715/764 |
| 2012/0066454 A1* | 3/2012 | Fuji | H04M 1/72519 711/115 |

FOREIGN PATENT DOCUMENTS

| CN | 1954627 A | 4/2007 |
| CN | 101490645 A | 7/2009 |
| CN | 101609430 A | 12/2009 |
| JP | 2010-271980 A | 12/2010 |

* cited by examiner

Primary Examiner — Maryam Ipakchi
(74) Attorney, Agent, or Firm — Canon U.S.A., Inc. IP Division

(57) ABSTRACT

It is determined whether an instruction for initial activation of an application is issued by a user or an operating system (step S702). If the instruction is issued by the user, a splash screen is displayed (step S715). If the instruction is issued by the operating system, the application is to be resident without displaying the splash screen (step S704). If a user issues an activation instruction with respect to the resident application (step S705), it is determined whether a screen display based on the activation instruction from the user is a first time or not (step S706). If it is not the first time, the splash screen is not displayed, and whereas if it is the first time, the splash screen is displayed (step S707).

5 Claims, 9 Drawing Sheets

FIG.5

500 SYSTEM SETTING STORAGE FILE

```
<?xml version= "1.0" encoding= "UTF-8"?>
<Information>
    <Mode>ON</Mode>  ~501 RESIDENT MODE
</Information>
```

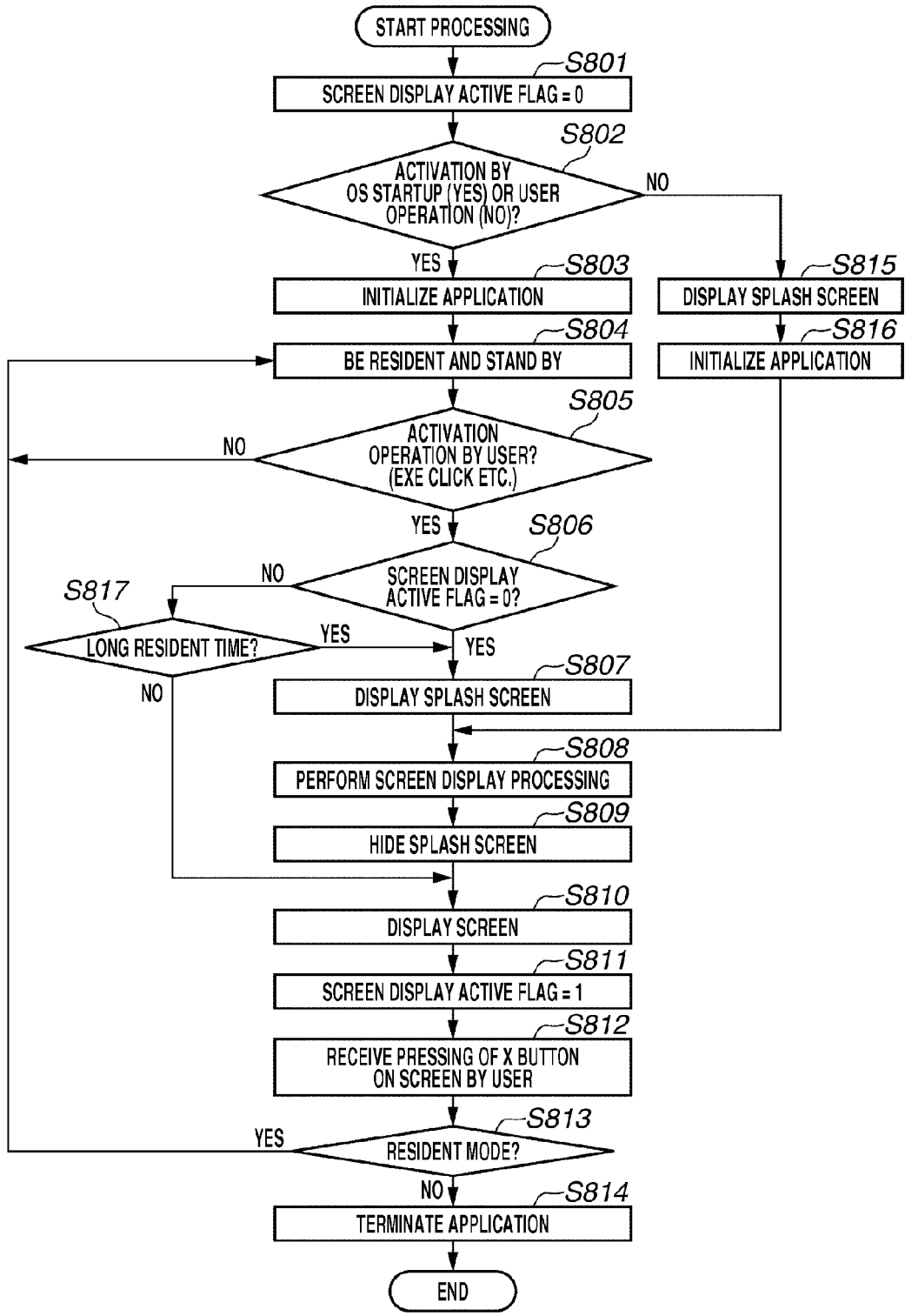

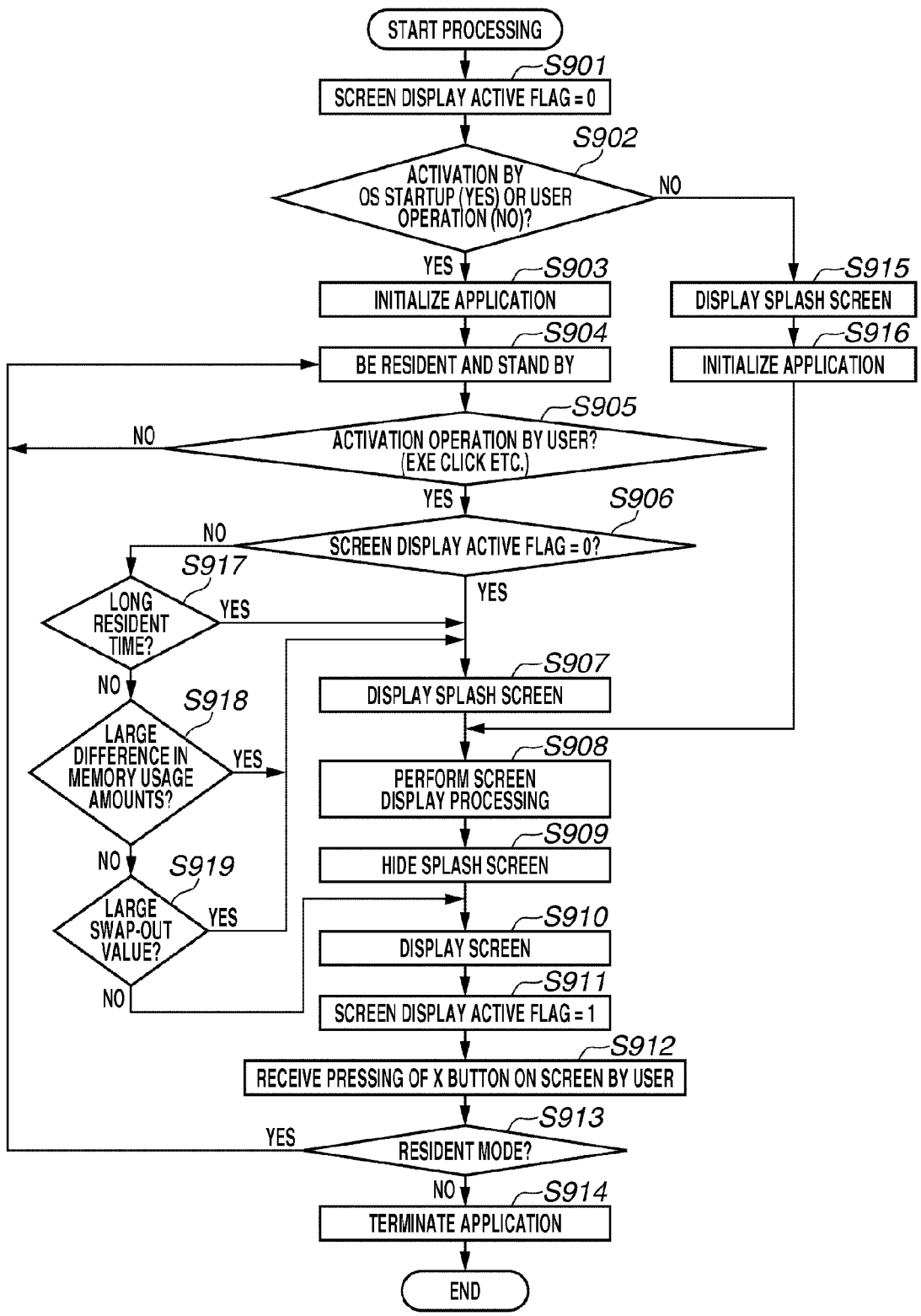

INFORMATION PROCESSING APPARATUS, APPLICATION ACTIVATION METHOD, AND PROGRAM

BACKGROUND OF THE INVENTION

1. Field of the Invention

The present invention relates to an information processing apparatus, a method for activating an application, and a program.

2. Description of the Related Art

There is a technique for displaying a splash screen (i.e., image) during activation of an application. Accordingly, activation of the application can be clearly indicated to a user. In addition, in order to shorten a time required to activate an application, there is a technique for activating the application when an operating system (OS) is started up and causing the application to be resident (i.e., the application is activated in the background and stayed resident). If the application is resident and is subjected to initialization processing to the extent possible, a time required for activation processing after an activation operation by a user can be shortened. A technique discussed in Japanese Patent Application Laid-Open No. 2010-271980 changes processing to be performed according to whether it is the first activation or not.

If an application which displays a splash screen is resident so as to shorten the activation processing time, the splash screen may be displayed at an unintended timing for a user in some cases. In addition, even if the application is resident, initialization processing for screen display takes time, and it may take time to display a screen after a user operation. Further, a user may feel different about operations between a case that the application is resident and a case that the application is not resident.

SUMMARY OF THE INVENTION

The present invention is directed to a technique capable of facilitating use of an information processing apparatus. More specifically, the present invention is directed to shortening of an activation time of an application as well as provision of an application capable of reducing an operation burden on a user.

According to an aspect of the present invention, a method for activating an application includes determining whether an instruction for initial activation of an application is issued by a user or an operating system, displaying a splash screen in a case where the instruction for initial activation of the application is issued by a user, causing the application to be resident without displaying the splash screen in a case where the instruction for initial activation of the application is issued by an operating system, determining, in a case where a user issues an activation instruction with respect to the resident application, whether a screen display based on the activation instruction from the user is a first time or not, and performing control not to display the splash screen in a case where the screen display is not the first time and control to display the splash screen in a case where the screen display is the first time.

According to exemplary embodiments of the present invention, an activation time of an application can be shortened and an operation burden on a user can also be reduced, so that the user can easily use the application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a system setting storage file.

FIG. 8 is a flow chart illustrating an example of splash screen display processing.

FIG. 9 is a flow chart illustrating an example of splash screen display processing.

DESCRIPTION OF THE EMBODIMENTS

Various exemplary embodiments, features, and aspects of the invention will be described in detail below with reference to the drawings. All of configurations described in the exemplary embodiments are not always essential to the means for solution according to the invention.

[System Configuration and Hardware Configuration]

Figure 1:
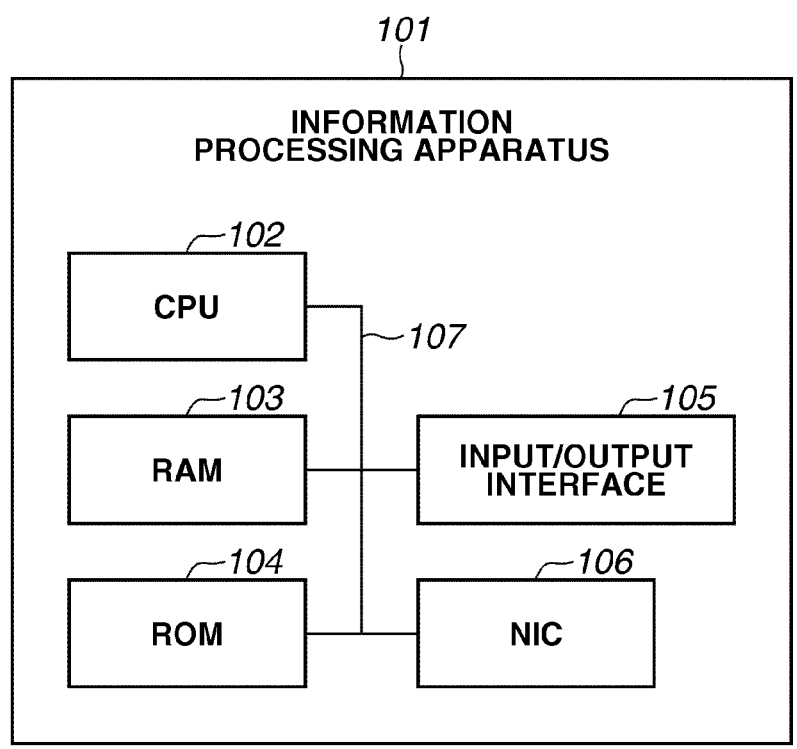
FIG. 1 illustrates an example of a system configuration and a hardware configuration.

A system configuration and a hardware configuration according to a first exemplary embodiment are described below with reference to FIG. 1. FIG. 1 illustrates an example of the system configuration and the hardware configuration. An information processing apparatus (i.e., computer) 101 is connected to a network (not illustrated) and further connected to the Internet (not illustrated) via the network. In FIG. 1, one information processing apparatus 101 according to the present exemplary embodiment is illustrated. However, a plurality of the information processing apparatuses 101 may be included in the system. The network and the Internet are the communication line networks supporting Transmission Control Protocol/Internet Protocol (TCP/IP protocol) and can be wired or wireless network.

The information processing apparatus 101 includes various units (102 to 107). A central processing unit (CPU) 102 executes various programs and realizes various functions according to the program. A read only memory (ROM) 104 stores various programs and data pieces. A random access memory (RAM) 103 stores various pieces of information. The RAM 103 is also used as a temporary working storage area. For example, the CPU 102 loads a program and/or data stored in the ROM 104 into the RAM 103 to execute the program.

An Input/Output interface 105 transmits data to a display unit (not illustrated) connected to the information processing apparatus 101 and also receives data input from a pointing device (not illustrated). A network interface card (NIC) 106 connects the information processing apparatus 101 to the network. Above-described units are configured to be able to exchange data with each other via a bus 107.

[Software Configuration (Entire Apparatus)]

Figure 2:
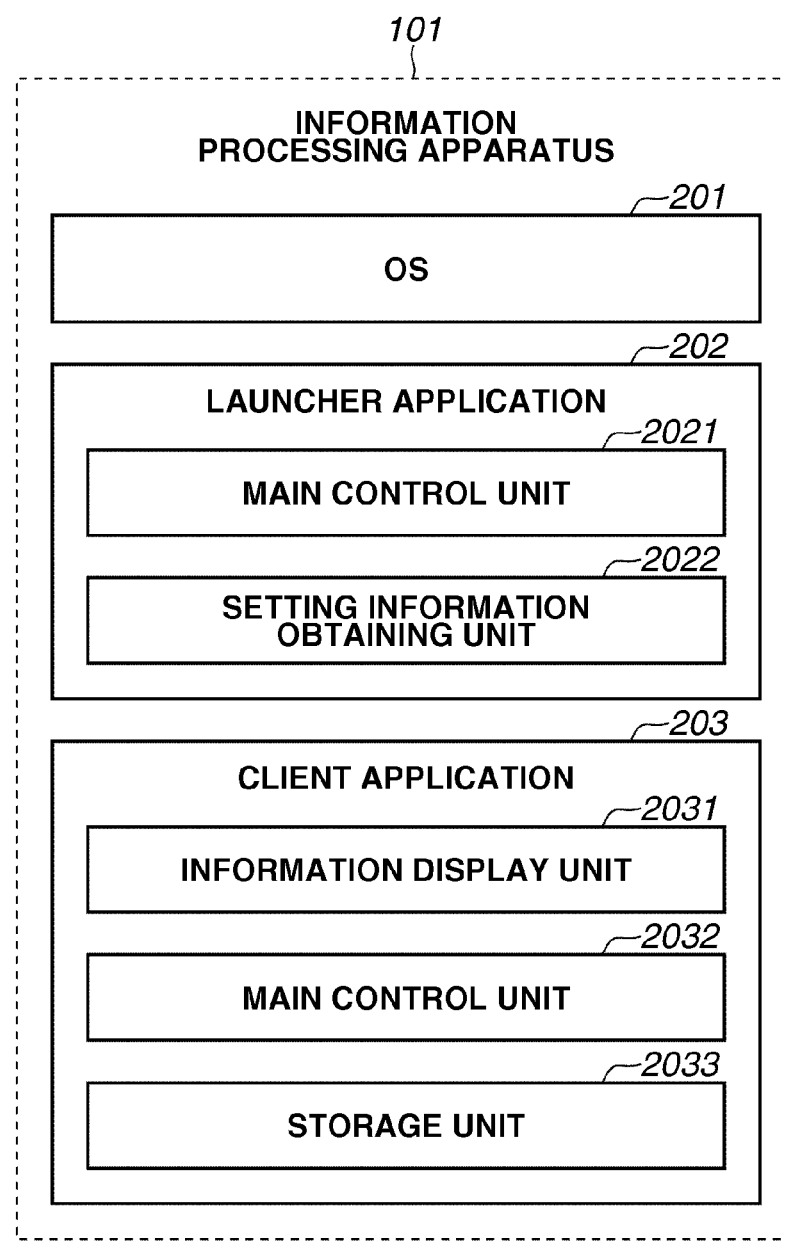
FIG. 2 illustrates an example of a software configuration of an information processing apparatus.

Next, a software configuration of the information processing apparatus 101 is described with reference to FIG. 2. FIG. 2 illustrates an example of the software configuration of the information processing apparatus 101.

A program for realizing functions (modules) of respective software units (applications) illustrated in FIG. 2 (i.e., an OS 201, a launcher application 202, and a client application 203) is stored in the ROM 104 or the like of the information processing apparatus 101. In other words, the CPU 102 loads and executes the program in the RAM 103 to realize functions of the apparatus and processing according to flow charts described below. All or a part of the functions of the apparatus and the processing according to the flow charts described below may be realized by using a dedicated hardware.

[Software Configuration (OS)]

Next, the operating system (OS) 201 is described. The OS 201 provides generally known OS functions such as a memory management, resource management, application management, and the like. When the OS 201 receives an application activation request from a user, the OS 201 transmits an execution request to each application, so that each application starts activation processing. In addition, the OS 201 provides a function of automatically activating an application which is registered in advance when the OS starts up. Hereinbelow, this function is referred to as a start-up function, and processing that an application is activated by the start-up function at the time of the start-up of the OS is referred to as start-up activation.

Further, the OS 201 manages a resident application. The resident application managed by the OS 201 is displayed in a list in a task bar provided by the OS to receive various operations by a user. Each application makes a resident request to the OS 201, so that the application is managed by the OS 201 as the resident application and displayed in the list in the task bar.

[Software Configuration (Client Application)]

Next, a software configuration of the client application 203 is described. The client application 203 includes various modules 2031 to 2033. A main control unit 2032 controls the client application 203, and issues instructions to and manage each module unit described below. An information display unit 2031 provides a user with a user interface (UI) of the client application 203 according to an instruction from the main control unit 2032.

Figure 3:
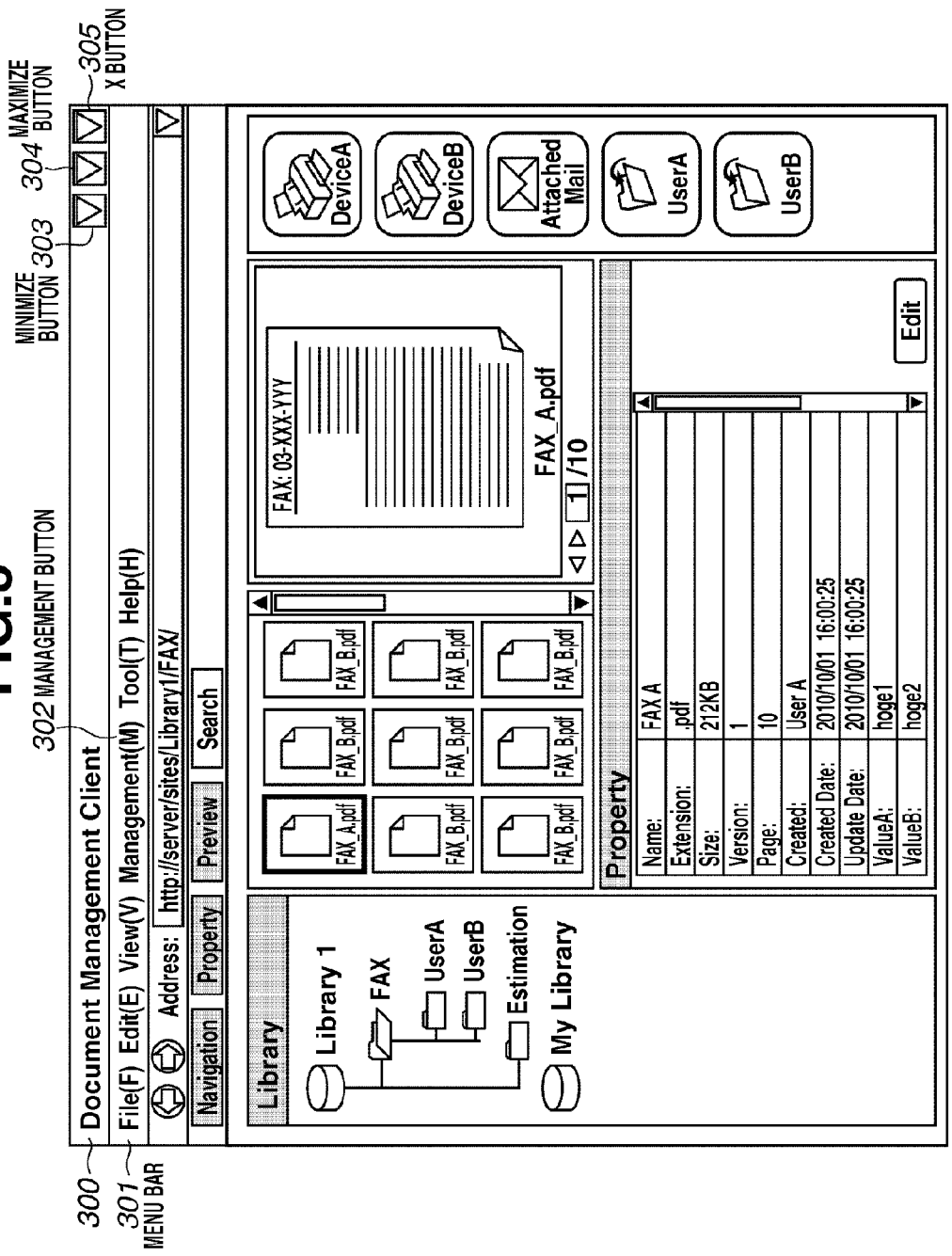
FIG. 3 illustrates an example of a main user interface (UI).

FIG. 3 illustrates an example of a main UI 300 of the client application 203. A menu bar 301 displays items (options) for enabling a user to input a setting value with respect to the client application 203. When a user operates the UI 300 of the client application 203, a system setting described below is performed. A form of the UI of the client application 203 (a position, a size, an arrangement, display contents, and the like) is not limited to the one illustrated in FIG. 3. Any form can be employed as long as it is appropriate for realizing the functions of the information processing apparatus 101.

An operation information obtaining unit (not illustrated) obtains information which is operated by a user on the UI of the client application 203 displayed by the information display unit 2031 and notifies the main control unit 2032 of the obtained information. The main control unit 2032 stores the notified information in a storage unit 2033 described below. The storage unit 2033 stores a setting value or the like which is input by the user via the information display unit 2031 and the operation information obtaining unit, in other words, via the UI of the client application 203. A Management button 302 is a button for displaying a system setting screen described below.

Figure 4:
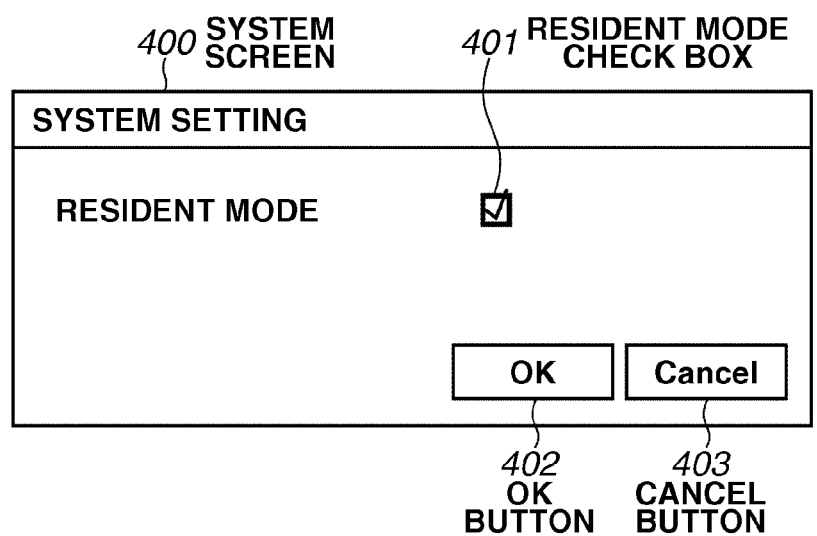
FIG. 4 illustrates an example of a system setting screen.

FIG. 4 is an example of a screen providing a UI for a system setting. A system setting screen 400 is a screen for performing a system setting related to entire control of the client application and is displayed when a user presses the Management button 302.

A resident mode check box 401 is a check button whether to set the client application 203 to a resident mode or not. If the resident mode check box 401 is checked, the client application 203 is in the resident mode, and if not checked, the client application 203 is not in the resident mode. An OK button 402 is used to store the setting value. If the user presses the OK button 402, the storage unit 2033 stores the setting value in a system setting storage file. Then, the system setting screen 400 is closed. A cancel button 403 is used to cancel to store the setting. If the user presses the cancel button 403, the system setting screen 400 is closed.

FIG. 5 is an example of a system setting storage file. A system setting storage file 500 stores a resident mode 501 as a setting value, and if the resident mode check box 401 is checked, a value is "ON", and if not checked, the value is "OFF". In FIG. 3, a minimize button 303 is a button for minimizing the currently displayed main UI 300. A maximize button 304 is a button for maximizing the currently displayed main UI 300. An X button 305 changes control when it is pressed according to whether the resident mode or not. When the X button 305 is pressed when the resident mode is ON, a resident request is input to the OS 201, and the client application is to be resident. When the X button 305 is pressed when the resident mode is OFF, the client application is terminated.

[Software Configuration (Launcher Application)]

Next, a software configuration of the launcher application 202 is described. The launcher application 202 includes various modules 2021 to 2022. A main control unit 2021 controls the launcher application 202 and issues instructions to and manage a setting information obtaining unit 2022. The setting information obtaining unit 2022 reads the setting values stored in the system setting storage file 500. Since the launcher application 202 is registered in the start-up function of the OS 201, the launcher application 202 is subjected to the start-up activation at the time of the start-up of the OS.

[Processing Flows for Launcher Application Activation and Client Application Activation]

Figure 6:
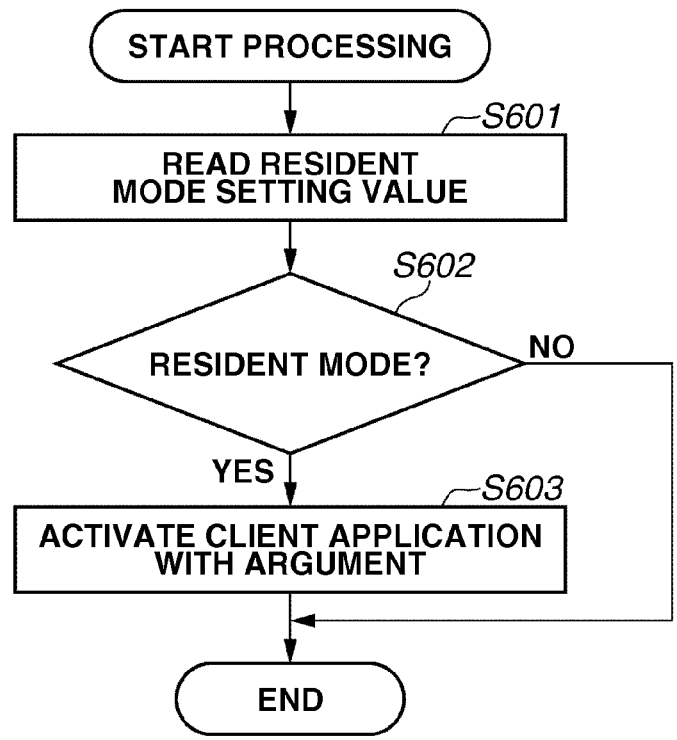
FIG. 6 is a flow chart illustrating an example of client application activation processing.

Activation processing of the client application 203 performed by the launcher application 202 in the information processing apparatus 101 is described with reference to FIG. 6. FIG. 6 is an example of a flow chart illustrating processing from activation of the launcher application 202 to activation of the client application 203.

In step S601, the main control unit 2021 of the launcher application 202 which receives a start-up activation request at the time of the OS start-up causes the setting information obtaining unit 2022 to read the setting value of the resident mode from the system setting storage file 500.

In step S602, the main control unit 2021 determines whether it is in the resident mode. If it is determined as the resident mode (YES in step S602), the processing proceeds to step S603. Whereas if it is not determined as the resident mode (NO in step S602), the processing is terminated.

In step S603, the main control unit 2021 activates the client application 203 with a resident mode parameter as an argument

[Splash Screen Display Processing Flow]

Figure 7:
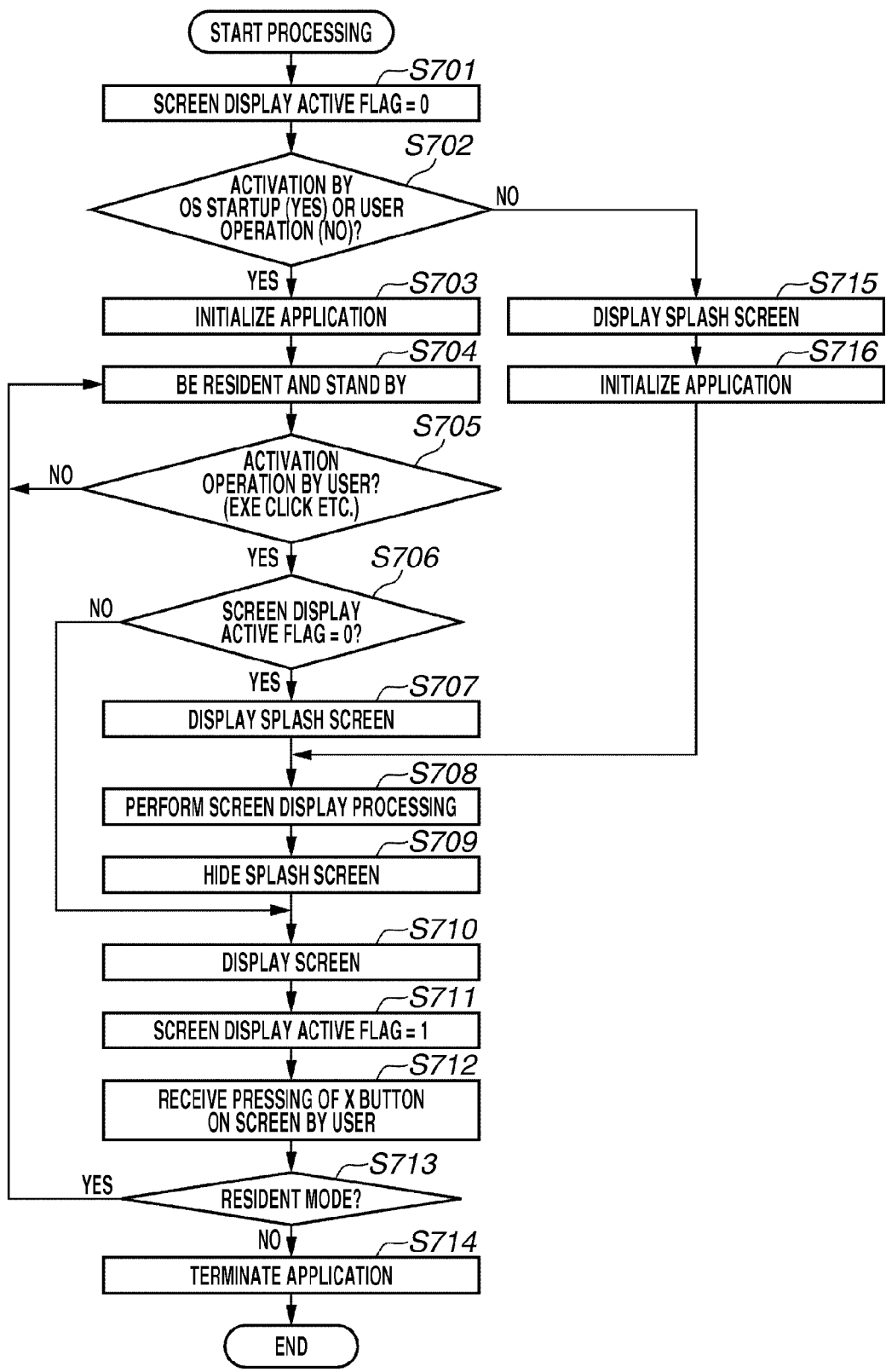
FIG. 7 is a flow chart illustrating an example of splash screen display processing.

A splash screen display processing performed by the client application 203 in the information processing apparatus 101 is described with reference to FIG. 7. FIG. 7 is an example of a flow chart illustrating processing from activation of the client application 203 to the splash screen display. The main control unit 2032 of the client application 203 starts the application activation processing based on a request for activation of the client application 203 from the OS 201.

In step S701, the main control unit 2032 of the client application 203 sets a screen display active flag to zero. The screen display active flag is a flag used to determine whether a screen display based on a start-up instruction from a user is performed in the past. If the screen display active flag is zero, it means that a screen display has never performed yet. If the screen display active flag is one, it means that a screen display has performed once or more.

Then, in step S702, the main control unit 2032 determines whether the activation of the client application 203 is initiated by a user operation or by a call from the start-up activation at the time of the OS start-up. The determination in step S702 is made based on the parameter which is passed as the argument when the request for activation of the client application 203 is input. In the parameter is passed as the argument, it is determined as the start-up activation (YES in step S702), and the processing proceeds to step S703. On the other hand, if the parameter is not passed as the argument, it is determined as the activation by the user operation (NO in step S702), and the processing proceeds to step S715. For example, the launcher application 202 activated by the start-up function activates the client application 203 by passing the parameter which is a result of the activation processing of the client application illustrated in the flow chart in FIG. 6 as the argument.

In step S703, the main control unit 2032 performs application initialization processing. Then, in step S704, the main control unit 2032 is to be resident and stands by.

In step S705, the main control unit 2032 receives an event from the OS 201. If the main control unit 2032 determines that the received event is a user action event (YES in step S705), the processing proceeds to step S706. Whereas if the main control unit 2032 determines that the received event is not a user action event (NO in step S705), the processing returns step S704. Examples of the user action events include double click on an executable file, and a click on an icon of a resident application list.

Then, in step S706, the main control unit 2032 determines whether the screen display active flag is zero. The processing in step S706 is to determine whether it is a first screen display based on the current start-up instruction from the user. If the screen display active flag is zero (YES in step S706), the processing proceeds to step S707. Whereas if the screen display active flag is one (NO in step S706), the processing proceeds to step S710.

In step S707, the main control unit 2032 displays a splash screen. Then, in step S708, the main control unit 2032 performs screen display initialization processing. For example, the main control unit 2032 performs initialization processing of control for screen display and reading processing of a setting file (not illustrated). Then, in step S709, the main control unit 2032 hides the splash screen.

In step S710, the main control unit 2032 displays a screen. In step S711, the main control unit 2032 sets the screen display active flag to one. Then, in step S712, if the user presses the X button on the screen, the main control unit 2032 receives an event corresponding to the pressed button.

In step S713, the main control unit 2032 causes the storage unit 2033 to read information in the system setting storage file 500 and determines whether the resident mode is ON. If it is determined that the resident mode is ON (YES in step S713), the processing returns to step S704. Whereas if it is determined that the resident mode is OFF (NO in step S713), the processing proceeds to step S714. In step S714, the main control unit 2032 performs application termination processing.

In step S702, if it is determined as the activation by the user operation (NO in step S702), then in step S715, the main control unit 2032 display the splash screen as in step S707. Then, in step S716, the main control unit 2032 performs the application initialization processing as in step S703.

More specifically, to display the splash screen (step S715) or not is controlled by the determination in step S702, so that the present exemplary embodiment can prevent the splash screen being displayed at an unintended timing for the user. Further, the splash screen is displayed at the time of the initialization processing of the screen display based on the determination of the screen display active flag in step S706, so that a waiting time for the user can be reduced. Furthermore, the splash screen is displayed based on the determination of the screen display active flag in step S706, so that difference in operational feelings of the user can be eliminated between a case that the application is resident and a case that the application is not resident.

As described above, the information processing apparatus according to the present exemplary embodiment can shorten an activation time of the application and also reduce an operation burden on the user, so that the user can easily use the application.

A second exemplary embodiment is described. In the second exemplary embodiment, configurations similar to the first exemplary embodiment are identified with the same reference numerals and detailed descriptions thereof are omitted. The splash screen display processing according to the client application 203 of the information processing apparatus 101 is described with reference to FIG. 8. FIG. 8 is an example of a flow chart illustrating processing from activation of the client application 203 to the splash screen display.

The processing from step S801 to step S816 are similar to those from step S701 to step S716 in FIG. 7.

Then, in step S817, the main control unit 2032 measures a time difference between when the resident mode is started and when the user inputs a screen display request (i.e., resident time), and compares the resident time with a splash screen re-display time value (not illustrated) stored in the storage unit 2033. If the resident time is longer than the splash screen re-display time value (YES in step S817), the processing proceeds to step S807. Whereas if the resident time is shorter than the splash screen re-display time value (NO in step S817), the processing proceeds to step S810. More specifically, according to the present exemplary embodiment, the splash screen is displayed again in a case where the resident time is long, so that awaiting time for the user can be reduced and user convenience can be improved.

A third exemplary embodiment is described. In the third exemplary embodiment, configurations similar to the first exemplary embodiment are identified with the same reference numerals and detailed descriptions thereof are omitted. The splash screen display processing according to the client application 203 of the information processing apparatus 101 is described with reference to FIG. 9. FIG. 9 is an example of a flow chart illustrating processing from activation of the client application 203 to the splash screen display.

The processing from step S901 to step S916 are similar to those from step S701 to step S716 in FIG. 7.

In step S918, the main control unit 2032 measures a difference in memory usage amounts of the client application 203 between when the resident mode is started and when the user inputs a screen display request, and compares the measured difference value with a memory difference value for re-displaying a splash screen (not illustrated) stored in the storage unit 2033. If the measured difference value is larger than a memory difference value for re-displaying a splash screen (YES in step S918), the processing proceeds to step S907. Whereas if the measured difference value is smaller than a memory difference value for re-displaying a splash screen (NO in step S918), the processing proceeds to step S919. More specifically, according to the present exemplary embodiment, the splash screen is displayed again in a case where the difference in the memory usage amount is large, so that awaiting time for the user can be reduced and user convenience can be improved.

Then, in step S919, the main control unit 2032 obtains a swap-out value (i.e., an amount of memory information written into a hard disk so as to increase a physical memory amount) of the client application 203 from the OS 201 when the user inputs a screen display request. Further, the main control unit 2032 compares the obtained swap-out value with a swap-out value for re-displaying a splash screen (not illustrated) stored in the storage unit 2033. If the obtained swap-out value is larger than a swap-out value for re-displaying a splash screen (YES in step S919), the processing proceeds to step S907. Whereas if the obtained swap-out value is smaller than a swap-out value for re-displaying a splash screen (NO in step S919), the processing proceeds to step S910. More specifically, according to the present exemplary embodiment, the splash screen is displayed again in a case where the swap-out value is large, so that a waiting time for the user can be reduced and user convenience can be improved.

Embodiments of the present invention can also be realized by a computer of a system or an apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-082381 filed Mar. 30, 2012, which is hereby incorporated by reference herein in its entirety.

What is claimed is:

1. A method for activating an application, the method comprising:
   determining whether an instruction for initial activation of an application is issued by a user or an operating system;
   displaying a splash screen in a case where the instruction for initial activation of the application is issued by a user;
   causing the application to be resident without displaying the splash screen in a case where the instruction for initial activation of the application is issued by an operating system;
   determining, in a case where a user issues an activation instruction with respect to the resident application, whether a screen display based on the activation instruction from the user is a first time or not;
   performing control not to display the splash screen in a case where the screen display is not the first time and control to display the splash screen in a case where the screen display is the first time;
   determining whether a resident time of the resident application exceeds a predetermined value; and
   displaying the splash screen regardless of whether the screen display is the first time or not in a case where the resident time exceeds the predetermined value.

2. The method according to claim 1, further comprising:
   determining whether a difference in memory usage amounts exceeds a predetermined value; and
   displaying the splash screen regardless of whether the screen display is the first time or not in a case where the difference in memory usage amounts exceeds the predetermined value.

3. The method according to claim 1, further comprising:
   determining whether a swap-out value exceeds a predetermined value; and
   displaying the splash screen regardless of whether the screen display is the first time or not in a case where the swap-out value exceeds the predetermined value.

4. A non-transitory computer-readable program for causing a computer to execute a method according to claim 3.

5. An information processing apparatus comprising:
   a unit configured to determine whether an instruction for initial activation of an application is issued by a user or an operating system;
   a unit configured to display a splash screen in a case where the instruction for initial activation of the application is issued by a user;
   a unit configured to cause the application to be resident without displaying the splash screen in a case where the instruction for initial activation of the application is issued by an operating system;
   a unit configured to, in a case where a user issues an activation instruction with respect to the resident application, determine whether a screen display based on the activation instruction from the user is a first time or not;
   a unit configured to perform control not to display the splash screen in a case where the screen display is not the first time and control to display the splash screen in a case where the screen display is the first time;
   a unit configured to determine whether a resident time of the resident application exceeds a predetermined value; and a unit configured to display the splash screen regardless of whether the screen display is the first time or not in a case where the resident time exceeds the predetermined value.

\* \* \* \* \*